(12) United States Patent
Colosseo et al.

(10) Patent No.: US 10,471,809 B2
(45) Date of Patent: Nov. 12, 2019

(54) STRUCTURE OF A DOOR FOR A MOTOR-VEHICLE

(71) Applicant: C.R.F. Soceita Consortile per Azioni, Orbassano (Turin) (IT)

(72) Inventors: Marco Colosseo, Orbassano (IT); Daniele Bassan, Orbassano (IT)

(73) Assignee: C.R.F. Societa Consortile per Azioni, Orbassano (Turin) (IT)

( * ) Notice: Subject to any disclaimer, the term of this patent is extended or adjusted under 35 U.S.C. 154(b) by 20 days.

(21) Appl. No.: 15/421,504

(22) Filed: Feb. 1, 2017

(65) Prior Publication Data

US 2017/0225547 A1    Aug. 10, 2017

(30) Foreign Application Priority Data

Feb. 4, 2016   (IT) .......................... 102016000011654

(51) Int. Cl.
   *B60J 5/04*    (2006.01)

(52) U.S. Cl.
   CPC .......... *B60J 5/0413* (2013.01); *B60J 5/0408* (2013.01); *B60J 5/048* (2013.01); *B60J 5/0431* (2013.01); *B60J 5/0465* (2013.01); *B60J 5/0469* (2013.01)

(58) Field of Classification Search
   CPC ...... B60J 5/0413; B60J 5/0463; B60J 5/0465; B60J 5/048; B60J 5/0431; B60J 5/0408
   See application file for complete search history.

(56) References Cited

U.S. PATENT DOCUMENTS

| | | | | |
|---|---|---|---|---|
| 2,791,464 | A | * | 5/1957 | Renno .................... B60J 5/0412 49/144 |
| 4,328,642 | A | * | 5/1982 | Presto .................... B60J 5/0406 49/502 |
| 4,512,240 | A | * | 4/1985 | Mahler .................. B60J 5/0405 454/124 |
| 4,648,208 | A | * | 3/1987 | Baldamus .............. B60J 5/0416 49/502 |
| 4,769,951 | A | * | 9/1988 | Kaaden .................. B60J 5/0405 296/146.6 |
| 4,860,496 | A | * | 8/1989 | Hellriegel .............. B60J 5/0405 49/502 |
| 5,820,191 | A | * | 10/1998 | Blakewood, Jr. ...... B60J 5/0413 296/37.13 |

(Continued)

FOREIGN PATENT DOCUMENTS

| | | |
|---|---|---|
| DE | 102013001028 A1 | 7/2014 |
| EP | 1149719 A3 | 7/2003 |
| KR | 101388474 B1 | 4/2014 |

OTHER PUBLICATIONS

Search Report for Italian Publication No. UB20160405 dated Sep. 19, 2016, 2 pages.

*Primary Examiner* — Justin B Rephann
(74) *Attorney, Agent, or Firm* — RMCK Law Group PLC

(57) ABSTRACT

Described herein is a structure of a motor-vehicle door including a multi-thickness metal sheet pressed and shaped to define: a hinge area configured for fastening one or more hinges for connection to the body of a motor vehicle; a panel area configured for receiving an upholstery-trim element for the door; and a frame area configured for receiving a window of the door. The above multi-thickness metal sheet has a first thickness in said hinge area, a second thickness in said panel area, and a third thickness in said frame area.

4 Claims, 2 Drawing Sheets

(56) References Cited

U.S. PATENT DOCUMENTS

| | | | | |
|---|---|---|---|---|
| 6,513,860 B1* | 2/2003 | Ourchane | ............... | B23K 31/02 |
| | | | | 296/146.5 |
| 7,766,414 B2* | 8/2010 | Krajewski | .............. | B60J 5/0405 |
| | | | | 296/146.5 |
| 9,010,839 B2* | 4/2015 | Schijve | .................. | B60J 5/0422 |
| | | | | 296/146.6 |
| 9,868,339 B2* | 1/2018 | Schijve | .................. | B60J 5/0422 |
| 2004/0049989 A1* | 3/2004 | Florentin | ............... | B60J 5/0411 |
| | | | | 49/502 |
| 2004/0216386 A1* | 11/2004 | Chernoff | ................ | B60J 5/0405 |
| | | | | 49/502 |
| 2004/0251711 A1* | 12/2004 | Walther | ................. | B23K 26/26 |
| | | | | 296/146.5 |
| 2005/0046227 A1* | 3/2005 | White | .................... | B60J 5/0405 |
| | | | | 296/146.6 |
| 2010/0045066 A1 | 2/2010 | Gress et al. | | |
| 2014/0008938 A1* | 1/2014 | Busch | .................... | B62D 25/04 |
| | | | | 296/193.06 |
| 2014/0312649 A1* | 10/2014 | Hashiguchi | ............ | B60J 10/085 |
| | | | | 296/146.5 |
| 2015/0174993 A1* | 6/2015 | Yi | ........................ | B60J 10/041 |
| | | | | 296/146.2 |
| 2015/0202950 A1* | 7/2015 | Garimella | .............. | B60J 5/0443 |
| | | | | 49/501 |
| 2015/0352933 A1 | 12/2015 | Bendiks et al. | | |
| 2016/0159207 A1* | 6/2016 | Ogawa | .................. | B60J 5/0427 |
| | | | | 49/504 |
| 2017/0166038 A1* | 6/2017 | Jang | ........................ | B60J 5/048 |

* cited by examiner

STRUCTURE OF A DOOR FOR A MOTOR-VEHICLE

CROSS REFERENCE TO RELATED APPLICATIONS

This application claims priority to Italian Patent Application No. 102016000011654 filed on Feb. 4, 2016, the entire disclosure of which is incorporated herein by reference.

FIELD OF THE INVENTION

The present invention relates to a door structure for a motor vehicle, in particular a structure including a multi-thickness metal sheet pressed and shaped to define:
- a hinge area configured for fastening one or more hinges for connection to the body of a motor vehicle;
- a panel area configured for receiving an upholstery-trim element for the door; and
- a frame area configured for receiving a window of the door.

PRIOR ART AND GENERAL TECHNICAL PROBLEM

FIG. 1 illustrates a motor-vehicle door 1 including a known door structure. The door 1 includes an outer metal sheet, or skin metal sheet, designated by the reference number 2, and a structural inner metal sheet, or "skeleton" metal sheet, designated by the reference number 3 and defining the structure of the door 1. For this reason, the reference 3 will at times be used in an undifferentiated way for identifying the multi-thickness metal sheet and the door structure.

The metal sheet 3 is a multi-thickness metal sheet pressed and shaped to define a hinge area H, a panel area P, and a frame area F. The use of multi-thickness metal sheets is amply known in the relevant technical field in so far as these metal sheets enable concentration of a larger amount of material in the sections of a component that are subjected to higher stresses thanks to the greater localized thickness of the metal sheet, enabling instead the sections subjected to lower stresses to be made of a smaller thickness to prevent excessive weight of the component.

The hinge area H is configured for fastening one or more hinges for connection to the body of a motor vehicle. In particular, it includes two supports 4, preferably in relief, fixed on which is a shaped plate of a first hinge element, whilst the shaped plate of the second hinge element is fixed to the body of the vehicle.

The panel area P is configured for receiving an upholstery-trim element for the door 1 and is purposely provided with a central window bordered with a plurality of holes or eyelets 7 in which fastening elements of an interior trim panel can be received.

The frame area F borders on the panel area P and includes a frame 7, which receives a window—generally a sliding window—of the door 1.

The multi-thickness metal sheet that constitutes the structure 3 has a band-wise differentiated thickness. The term "band-wise differentiated thickness" is intended to indicate a configuration wherein the gradient of thickness is substantially unidirectional along the metal sheet. In other words, the thickness varies in just one direction over the metal sheet itself (typically the direction transverse to the bands). In particular, the metal sheet includes a first band 3A and a second band 3B, which are separated by a border S. The band 3A covers the entire hinge area H and part of the frame area F. In particular, it intercepts a part of the frame 7 located in the proximity of the hinge area H. The band 3B covers the panel area P and the remaining height of the frame area F. In this connection, in FIG. 1 the perimeters of the areas H, P, F are schematically represented, in the case where they do not coincide with edges of the metal sheet 3. A curve γ marks the boundary between the hinge area H and the frame area F, and the frame area F and the panel area P. The latter is then delimited with respect to the hinge area H by the boundary S (up to the point of intersection of the boundary S with the curve γ).

Since the hinge area H is the one structurally most stressed, the band 3A has a thickness greater than that of the band 3B.

To emphasize once again the scheme of division of the structure 3 into the areas H, P, F, note how the boundary S can have a markedly one-dimensional development (boundary line) in the case where the multi-thickness metal sheet is a so-called "tailored welded blank", i.e., a metal sheet obtained by butt-welding of two metal sheets having different thicknesses. In this case, the boundary S coincides with the welded joint between the two metal sheets, and the metal sheet has a substantially step-like cross section straddling the two areas of different thickness.

However, the boundary S can also correspond to an area of transition (shaped like a vertical band in this case) in the possible case where the multi-thickness metal sheet is a so-called "tailored rolled blank", i.e., a seamless metal sheet in which rolling is carried out so as to confer different thicknesses to different areas of the metal sheet itself, for example by varying the centre distance between the rolls or by varying the distance between the rolling surfaces (with rolls shaped with a multi-relief profile). In this case, the area of transition is necessary for accommodating the transition from one thickness to another, and the metal sheet has a substantially ramp-like cross section straddling the areas of different thickness.

Whatever the type of metal sheet chosen, having areas with a differentiated thickness 3A and 3B in the form of vertical bands (the orientation is defined with respect to the door itself) inevitably leads to having the boundary S located at the frame area F, in particular in a visible position on the frame 7. This condition is undesirable in so far as, especially in the case of tailored welded blanks, the portion of frame 7 where the boundary line is positioned remains in view and provides the frame 7 with a discontinuous appearance, which is far from pleasant to the eye of the user. This problem also afflicts multi-thickness metal sheets of the tailored-rolled-blank type, especially in the case where the width of the area of transition is reduced to a minimum, thus leading to a shape that presents a more perceptible lack of uniformity of appearance.

OBJECT OF THE INVENTION

The object of the present invention is to solve the technical problem mentioned previously. In particular, the object of the present invention is to provide a door structure made of multi-thickness metal sheet in which, albeit maintaining an advantageous distribution of the areas of different thickness according to the local stresses, any unattractive areas that remain exposed in the finished product will be absent.

SUMMARY OF THE INVENTION

The object of the invention is achieved by a motor-vehicle door structure having the features forming the subject of one or more of the appended claims, which form an integral part of the technical disclosure provided herein in relation to the invention.

In particular, the object of the invention is achieved by a motor-vehicle door structure having all the features referred to at the beginning of the present description and moreover characterized in that said multi-thickness metal sheet has a first thickness in correspondence of the hinge area, a second thickness in correspondence of the panel area, and a third thickness in correspondence of the frame area.

BRIEF DESCRIPTION OF THE FIGURES

The invention will now be described with reference to the attached figures, which are provided purely by way of non-limiting example and wherein.

DETAILED DESCRIPTION

Figure 2:
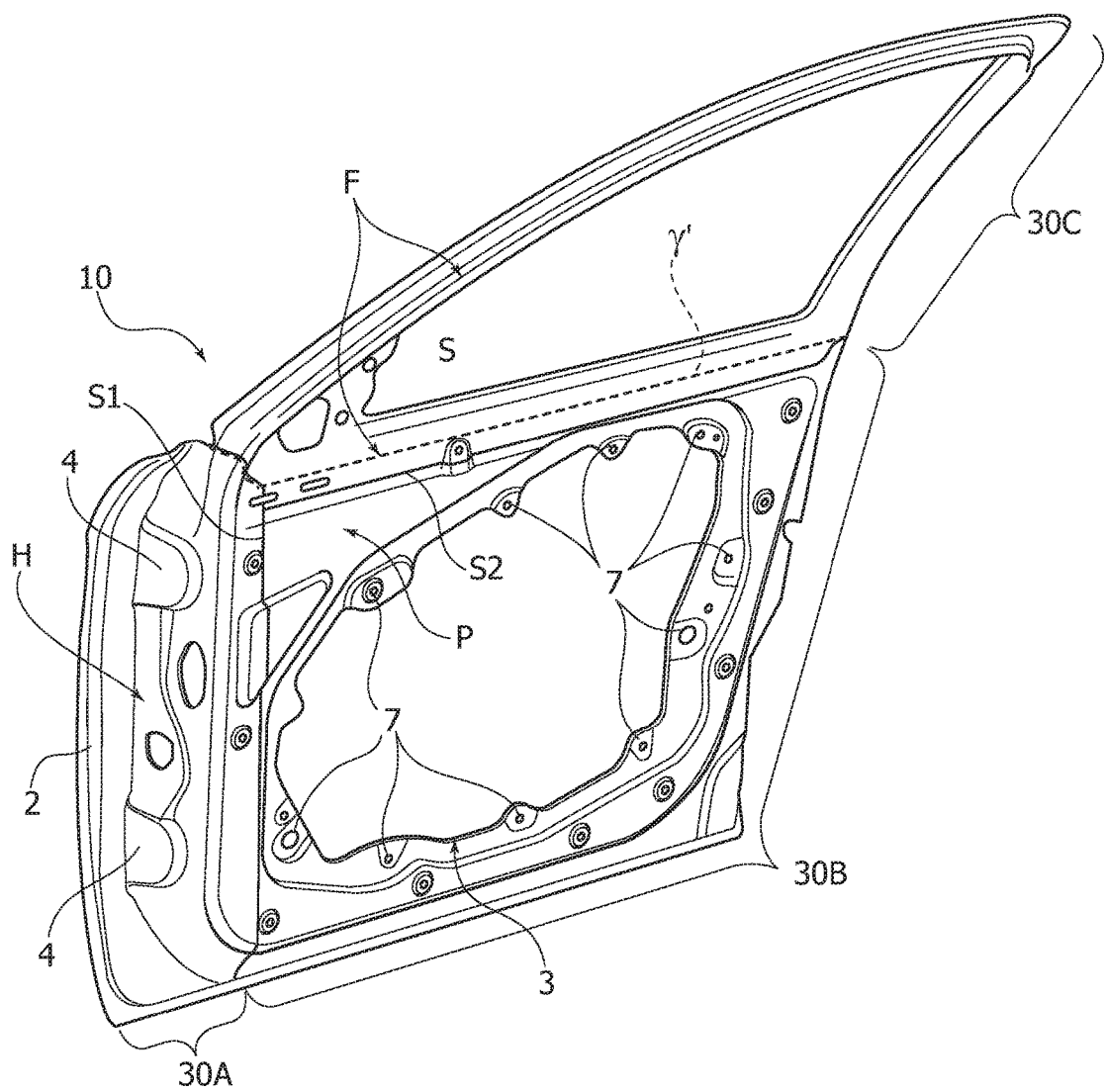
FIG. 2 is a perspective view of a motor-vehicle door incorporating a door structure according to the invention.

The reference number 10 in FIG. 2 designates as a whole a motor-vehicle door including a door structure according to the invention. All the references that are identical to those mentioned previously designate the same components already described.

The door 10 includes an outer metal sheet (or skin metal sheet) 2, and a structural inner metal sheet, or "skeleton" metal sheet, designated by the reference number 30 and defining the structure of the door 1. For this reason, the reference 30 will at times be used in an undifferentiated way for identifying the multi-thickness metal sheet and the door structure.

The metal sheet 30 is a multi-thickness metal sheet pressed and shaped to define the hinge area H, the panel area P, and the frame area F.

As in the case of the door 1, the hinge area H is configured for the fastening of one or more hinges for connection to the body of a motor vehicle, and in particular it includes the supports 4, preferably in relief, fixed on which is a shaped plate of a first hinge element, whilst the shaped plate of the second hinge element is fixed to the body of the vehicle.

Once again like in the door 1, the panel area P is configured for receiving an upholstery-trim element for the door 1 and is purposely provided with a central window bordered with a plurality of holes or eyelets 7 in which fastening elements of an interior trim panel can be received.

Finally, once again in a way identical to the door 1, the frame area F borders on the panel area P and includes a frame 7 that receives a window—generally a sliding window—of the door 10.

The multi-thickness metal sheet that constitutes the structure 30 has an area-wise differentiated thickness. The term "area-wise differentiated thickness" is intended to indicate a configuration in which the gradient of thickness is multidirectional over the metal sheet. In other words, the thickness varies in more than one direction over the metal sheet itself.

In particular, the multi-thickness metal sheet that constitutes the structure 30 includes a first area 30A having a first thickness, a second area 30B having a second thickness, and a third area 30C having a third thickness. A rolling process that can preferentially be used to obtain a multi-thickness metal sheet for the structure 30 is described in the Italian patent application for industrial invention No. 102016000011482 filed in the name of the present applicant on the same date.

When the multi-thickness metal sheet of which the structure 30 is made is pressed and shaped to define the hinge area H, the panel area P, and the frame area F, the following circumstances arise:

the area 30A coincides with the hinge area H, so that the metal sheet has the first thickness in the hinge area H;

the area 30B coincides with the panel area P, so that the metal sheet has the second thickness in the panel area P; and the area 30C coincides with the frame area F, so that the metal sheet has the third thickness in the frame area F.

Since the hinge area H is the one that is structurally subjected to the highest stresses, the thickness of the area 30A (first thickness) is greater than the thickness of the area 30B (second thickness) and the thickness of the area 30C (third thickness). According to the embodiment considered, the second thickness (area 30B) may be identical to the third thickness (area 30C), or else the two thicknesses may be different: the third thickness may be greater than the second thickness or vice versa according to the needs, but both are always smaller than the first thickness.

In FIG. 2 again represented schematically are the perimeters of the areas H, P, F in the case where they do not coincide with edges of the metal sheet 30. Once again, the division of the structure 30 into the areas H, P, F is schematic and contemplates the two possiblities of multi-thickness metal sheet of the tailored-welded-blank type and multi-thickness metal sheet of the tailored-rolled-blank type, as for the door 1.

Figure 1:
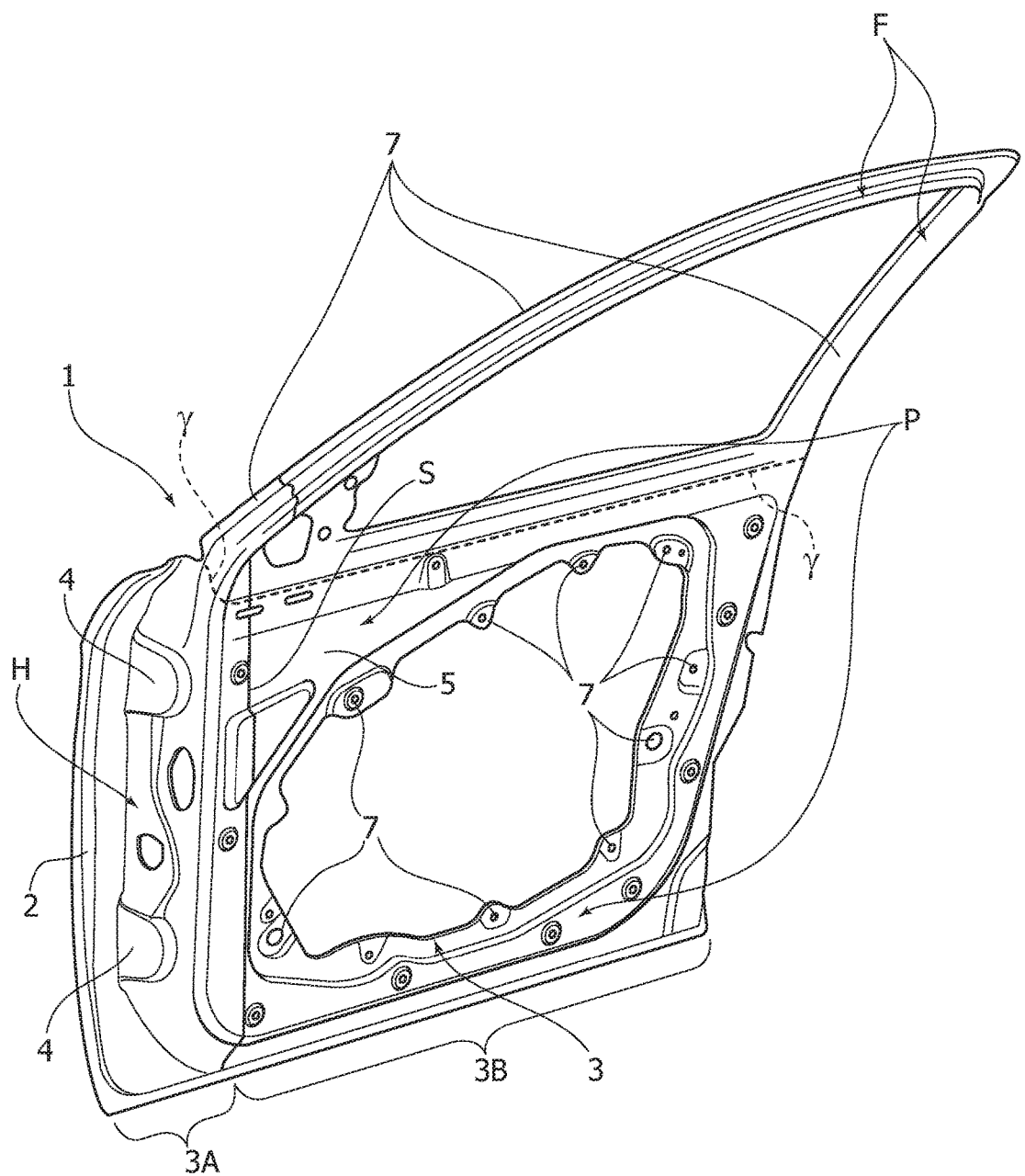
FIG. 1, already described above, is a perspective view of a motor-vehicle door incorporating a door structure of a known type.

According to the invention, on account of the characteristics of the multi-thickness metal sheet 30, a boundary S1 delimits the hinge area H from the areas P and F, whereas a curve γ' incident on the boundary S1 delimits the frame area F with respect to the panel area P. It should be noted that the union of the curve γ' and the boundary stretch S1 that spans from the point of intersection with the curve γ' up to the edge of the frame 7 corresponds to the curve γ of the door 1 of FIG. 1.

In other words, the use of a structure 30 made of multi-thickness metal sheet with area-wise differentiated thickness, where the areas are sized so as to correspond to the three notable areas H, P, F of the structure 1 following upon pressing of the metal sheet, enables shifting of the boundary S1 between portions of metal sheet of different thicknesses that form the hinge area H and frame areas F into a position that coincides with the boundary that delimits the areas themselves. Above all, location of the boundary S1 is in a position such as not to remain exposed on the outside on the finished product. It should be noted, in fact, that the position of the boundary S1 is such that it is completely covered at the moment of upholstering of the door 10.

The above advantageous effect is obtained both in the case of a structure 30 made from a tailored welded blank and in the case of a structure 30 made from a tailored rolled blank.

The invention may moreover be applied irrespective of the material of the metal sheet that constitutes the structure 30. In particular, materials that are typically used for automotive applications include steel and aluminium (alloys thereof).

The invention is moreover applicable both to front doors and to rear doors. In addition, the invention is applicable also to doors designed for closing loading compartments of a vehicle, such as a hatch-back door.

Of course, the details of construction and the embodiments may vary widely with respect to what has been described and illustrated herein, without thereby departing from the scope of protection of the present invention, as defined by the annexed claims.

What is claimed is:

1. A structure of a door for a motor vehicle including a multi-thickness metal sheet pressed and shaped to define:
   a hinge area configured for fastening of one or more hinges for connection to a body of a motor vehicle,
   a panel area separate from the hinge area and configured to receive a trim member for the door, and
   a frame area separate from the hinge and panel areas and configured for housing a window of the door,
   wherein said multi-thickness metal sheet has a first cross-sectional thickness in said hinge area, a second cross-sectional thickness in said panel area, and a third cross-sectional thickness in said frame area,
   wherein the first cross-sectional thickness is greater than said second cross-sectional thickness and said third cross-sectional thickness, and
   wherein said second cross-sectional thickness and third cross-sectional thickness are different, and
   wherein the multi-thickness metal sheet includes:
   a single, tailored rolled metal sheet having an absence of welding,
   an area-wise differentiated thickness, and
   a boundary line where the panel area and the frame area meet, said boundary line positioned in the multi-thickness metal sheet such that it is unexposed and not visible in the frame area with the interior trim member being coupled to the panel area.

2. The structure according to claim 1, wherein said multi-thickness metal sheet is a multi-thickness sheet rolled with a variable thickness.

3. A motor vehicle door including the structure according to claim 1.

4. The motor vehicle door according to claim 3, further comprising a skin sheet connected to said structure.

* * * * *